L. O. RATHER.
MOTION PICTURE SCREEN.
APPLICATION FILED APR. 21, 1914.
1,106,111.
Patented Aug. 4, 1914.
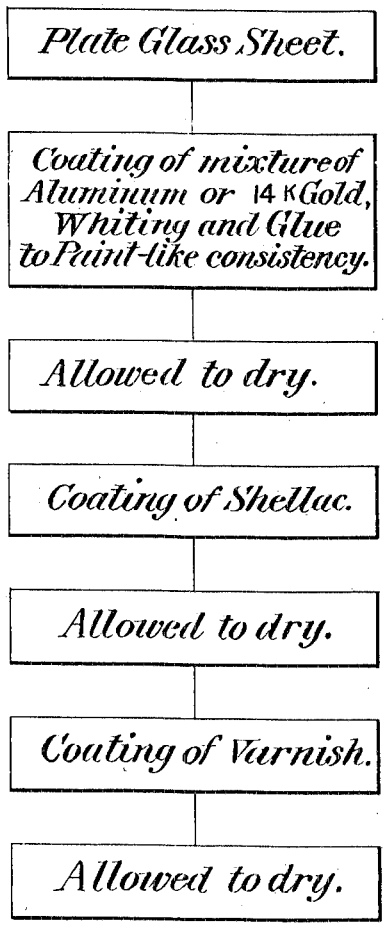
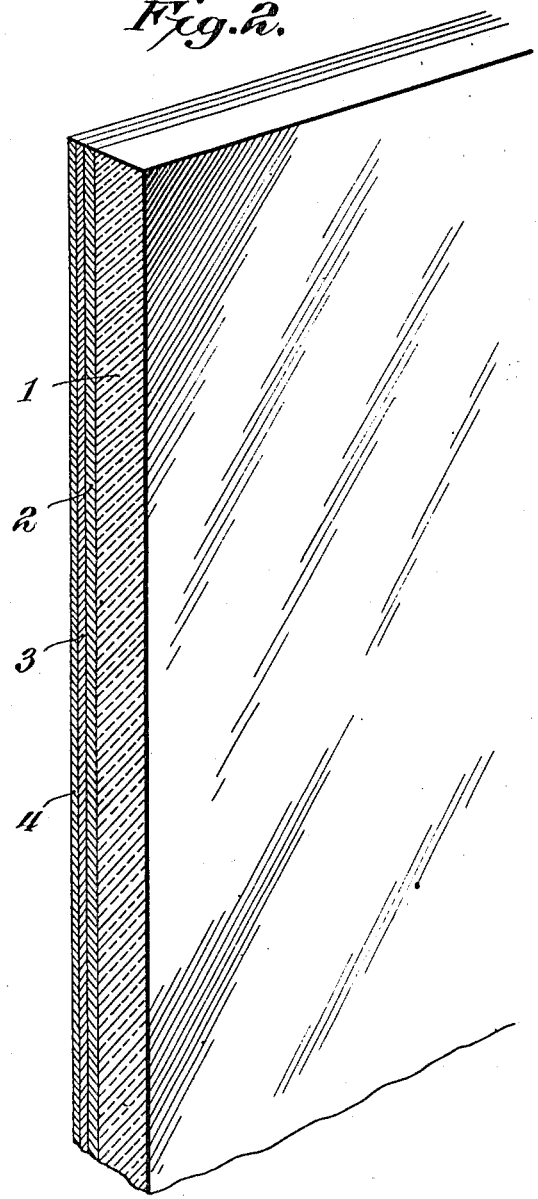
WITNESSES
L. O. Rather, INVENTOR,

UNITED STATES PATENT OFFICE.

LEE O. RATHER, OF NASHVILLE, TENNESSEE, ASSIGNOR TO ROBERT H. WALLER, OF NASHVILLE, TENNESSEE.

MOTION-PICTURE SCREEN.

1,106,111.   Specification of Letters Patent.   Patented Aug. 4, 1914.

Application filed April 21, 1914. Serial No. 833,410.

*To all whom it may concern:*

Be it known that I, LEE O. RATHER, a citizen of the United States, residing at Nashville, in the county of Davidson and State of Tennessee, have invented a new and useful Motion-Picture Screen, of which the following is a specification.

This invention has reference to improvements in motion picture screens, and while useful as a screen for the projection of other types of pictures than motion pictures, is particularly useful in connection with the projection of motion pictures.

The object of the present invention is to provide a screen returning by far the greater portion of the light projected against it to the eye of the observer, so that the primary source of light may be less intense than heretofore without diminution of the brilliancy of the picture upon the screen. Furthermore, because of the intensity of the reflection from the screen the auditorium may be lighter than is possible with screens absorbing a greater proportion of the light thrown against them.

In motion picture screens portability is of no moment, and hence it is customary to make the screen a permanent part of the auditorium, wherefore the present invention includes a supporting member which may be in the form of a sheet of plate glass, and this glass sheet of appropriate size is backed up by a coating of a mixture embodying both reflecting and light diffusing qualities, such mixture being applied directly to that surface of the glass remote from the observer, and which may therefore be called the rear surface of the glass, and because of the nature of the surface so produced it is protected by coatings of resinous material resistant to atmospheric conditions. With such an arrangement the reflecting surface is perfectly smooth, giving a restful picture to the eyes, while the cost of production is relatively low and no distracting reflections are present. Furthermore, the light absorbed by the screen is so slight as to be negligible, and the reflection is so nearly complete as to permit the use of a less intense primary source of light, and, as such source is customarily an electric arc, the use of the screen results in a saving of current consumption.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a diagrammatic display of the various steps in the manufacture of the screen. Fig. 2 is a perspective view, partly in section, showing a small portion of a screen constructed in accordance with the present invention but with the proportions exaggerated.

Referring to the drawings there is shown in Fig. 2 a fragment of a sheet 1 of plate glass which may be considered as of appropriate size for the purpose. Such a sheet of glass has plane surfaces free from irregularities, and is eminently adapted for the purposes of the invention. Applied to the rear face of the plate glass 1, that is, the face remote from the observer, is a coating 2 which by reference to the second rectangle from the top of Fig. 1 is composed of a mixture of aluminum or 14 karat gold, with whiting and glue to an initially paint-like consistency. Either the aluminum or the gold is in finely divided condition, and an equal amount of whiting, preferably French whiting, is mixed therewith. These two ingredients, that is, whiting and either aluminum or gold, are thoroughly incorporated with sufficient glue to form a mixture of about the consistency of ready mixed paint, and such mixture is coated upon the back of the plate glass sheet 1, and is allowed to dry.

The application of the coating to the back of the plate glass may be made by a brush, since the consistency of the coating is such as to flow easily with a brush. After the first coating is dried a coating 3 of shellac is applied. This is useful in preventing any sweating of the first coating in which glue is present binding the materials together, for such sweating would tend to cause the first coating to peel off. In order to more perfectly protect the coating there is applied a final coating 4 of varnish, which acts as a preservative and, of course, this final coating of varnish is likewise permitted to dry before the screen is put into use.

The surface of the screen is perfectly smooth and is not subject to weather conditions, and cannot wrinkle and is, therefore, particularly pleasing to the eye of the beholder when a picture is projected upon the screen. Moreover, the screen has proven in actual practice to reduce the electric current necessary for a projection of the pictures to about one-half of that required for cloth and other screens, and is free from the disagreeable reflections found in so-called mirror screens. Because of the glass support it can be wiped off when dusty with a damp cloth or sponge.

The improved screen can be sold for not much more than half the cost of mirror screens.

Actual tests show that a twenty-five ampere arc lamp is sufficient for the production of bright pictures at a distance of one hundred feet, this being a saving of nearly fifty per cent. in current over that necessary for the illumination of the picture when projected upon other screens.

The metal incorporated in the first coating gives a multitude of reflecting surfaces returning a great mass of the light to the eye of the observer, but these surfaces are so minute that no disagreeable glaring reflections can occur. Moreover, there is also interspersed throughout the reflecting surface of the screen many minute diffusive particles represented by the whiting, so that any observable reflections are wholly prevented by the diffusing action of the great multitude of particles of whiting, and the combined mass of light-reflecting and diffusing particles, while breaking up all noticeable reflections, at the same time do actually return the light to the eye of the beholder almost as completely as would be the case with a mirror. While the metallic content of the composition has a grayish or golden tint in accordance with the metal employed, the whiting returns the white light almost completely, since whiting is markedly white. The combined constituents of the composition therefore impart to the visible surface of the screen a tint slightly reduced from a glaring white and wholly free from the disagreeable brilliancy of a smooth metallic reflecting surface, so that the eye of the beholder is not strained or tired either by an intense white of the high lights or disagreeable reflections coming from a broad extent of metallic reflecting surface. The amount of light, however, which reaches the eye of the observer is not noticeably reduced over that returned from a mirror surface, but the quality of the light is such as to be particulary pleasing to the eye of the observer. Because of the great amount of light reflected back from the screen and the negligible absorption of light, a marked reduction in current consumption is brought about without sacrifice of the brilliancy of the picture as seen by the observer, while at the same time the eye of the observer is not fatigued since the quality of the reflected light due to the presence of both the metal and the whiting is particularly pleasing.

What is claimed is:—

1. A screen for projection pictures comprising a plate glass support with a reflecting backing consisting of a coating of finely divided metal, whiting, and an adhesive.

2. A screen for projection pictures comprising a plate glass support with a reflecting backing consisting of a coating of finely divided metal, whiting, and an adhesive, the said coating being backed up by a coating of shellac and the shellac coating by a coating of varnish.

3. A screen for projection pictures comprising a sheet of glass backed up by a coating composed of a mixture of metal powder, whiting, and an adhesive, and a protecting coating of resinous material applied to the first-named coating.

4. A screen for projection pictures comprising a sheet of plate glass of suitable size backed up by a coating composed of a mixture of fine particles of naturally light-reflecting metal with equal parts of a finely divided white mineral substance, and an adhesive for holding the mixture of fine particles together and to the glass.

5. A screen for projection pictures comprising a sheet of plate glass of suitable size backed up by a coating composed of a mixture of fine particles of naturally light-reflecting metal with equal parts of a finely divided white mineral substance, and an adhesive for holding the mixture of fine particles together and to the glass, said coating being backed up by a protecting coating of material resistant to climatic and weather conditions.

6. A screen for projection pictures comprising a sheet of plate glass of suitable size backed up by a coating composed of equal parts of finely divided light reflecting metal and whiting mixed with glue to an initial consistency substantially that of ready mixed paint, and a backing of resinous material applied to the first named coating.

In testimony that I claim the foregoing as my own, I have hereto affixed my signature in the presence of two witnesses.

LEE O. RATHER.

Witnesses:
C. COOPER,
PERRY HOUSE.